US012669349B2

(12) United States Patent
Monji et al.

(10) Patent No.: US 12,669,349 B2
(45) Date of Patent: Jun. 30, 2026

(54) SYSTEM AND METHOD FOR VEHICLE TRACK GENERATION FROM RISK MAPS

(71) Applicant: Hitachi Astemo, Ltd., Hitachinaka (JP)

(72) Inventors: Tatsuhiko Monji, Ibaraki (JP); Ryoh Inaba, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 42 days.

(21) Appl. No.: 18/832,066

(22) PCT Filed: Feb. 21, 2022

(86) PCT No.: PCT/JP2022/006964
§ 371 (c)(1),
(2) Date: Jul. 22, 2024

(87) PCT Pub. No.: WO2023/157301
PCT Pub. Date: Aug. 24, 2023

(65) Prior Publication Data
US 2025/0130066 A1 Apr. 24, 2025

(51) Int. Cl.
*G01C 21/00* (2006.01)
*G08G 1/16* (2006.01)

(52) U.S. Cl.
CPC ........... *G01C 21/3837* (2020.08); *G08G 1/16* (2013.01)

(58) Field of Classification Search
CPC .............................. G01C 21/3837; G08G 1/16
See application file for complete search history.

(56) References Cited

U.S. PATENT DOCUMENTS

2017/0039865 A1* 2/2017 Takabayashi .......... G08G 1/166
2018/0149481 A1 5/2018 Hirai
(Continued)

FOREIGN PATENT DOCUMENTS

JP 2017-041149 A 2/2017
JP 2020-053069 A 4/2020
(Continued)

OTHER PUBLICATIONS

International Search Report Issued in PCT Application No. PCT/JP2022/006964 dated May 17, 2022, with English Translation.
(Continued)

*Primary Examiner* — Scott A Browne
*Assistant Examiner* — Terry C Buse
(74) *Attorney, Agent, or Firm* — Foley & Lardner LLP

(57) ABSTRACT
An in-vehicle electronic controller includes a risk map generating unit that determines a traveling risk level in an area around the vehicle, based on external environment information acquired by an external environment sensor installed in the vehicle, movement information on the vehicle, and map information, and that maps the traveling risk level onto a map to generate a risk map; and a track generating unit that generates a traveling track of the vehicle, using the risk map. The track generating unit generates at least one binarized image representing the risk map divided into a low risk area and a high risk area, by a binarization process by which whether the traveling risk level is larger than a given set value is determined, performs a thinning process on the at least one binarized image to determine a center line in a width direction of the low risk area, and generates a traveling track of the vehicle, based on the determined center line.

6 Claims, 8 Drawing Sheets

(56)                    References Cited

U.S. PATENT DOCUMENTS

| | | | | |
|---|---|---|---|---|
| 2019/0106103 A1* | 4/2019 | Inoue | .................... | B60K 31/02 |
| 2019/0333386 A1* | 10/2019 | Horita | ................... | G08G 1/166 |
| 2021/0116930 A1 | 4/2021 | Ariki | | |
| 2021/0300348 A1* | 9/2021 | Yasui | .................... | G06N 3/092 |

FOREIGN PATENT DOCUMENTS

| | | | | |
|---|---|---|---|---|
| WO | WO-2019/167457 A1 | 9/2019 | | |
| WO | WO-2021054051 A1 * | 3/2021 | ............ | G08G 1/167 |

OTHER PUBLICATIONS

Written Opinion Issued in PCT Application No. PCT/JP2022/006964 dated Apr. 26, 2022.

* cited by examiner

FIG. 3

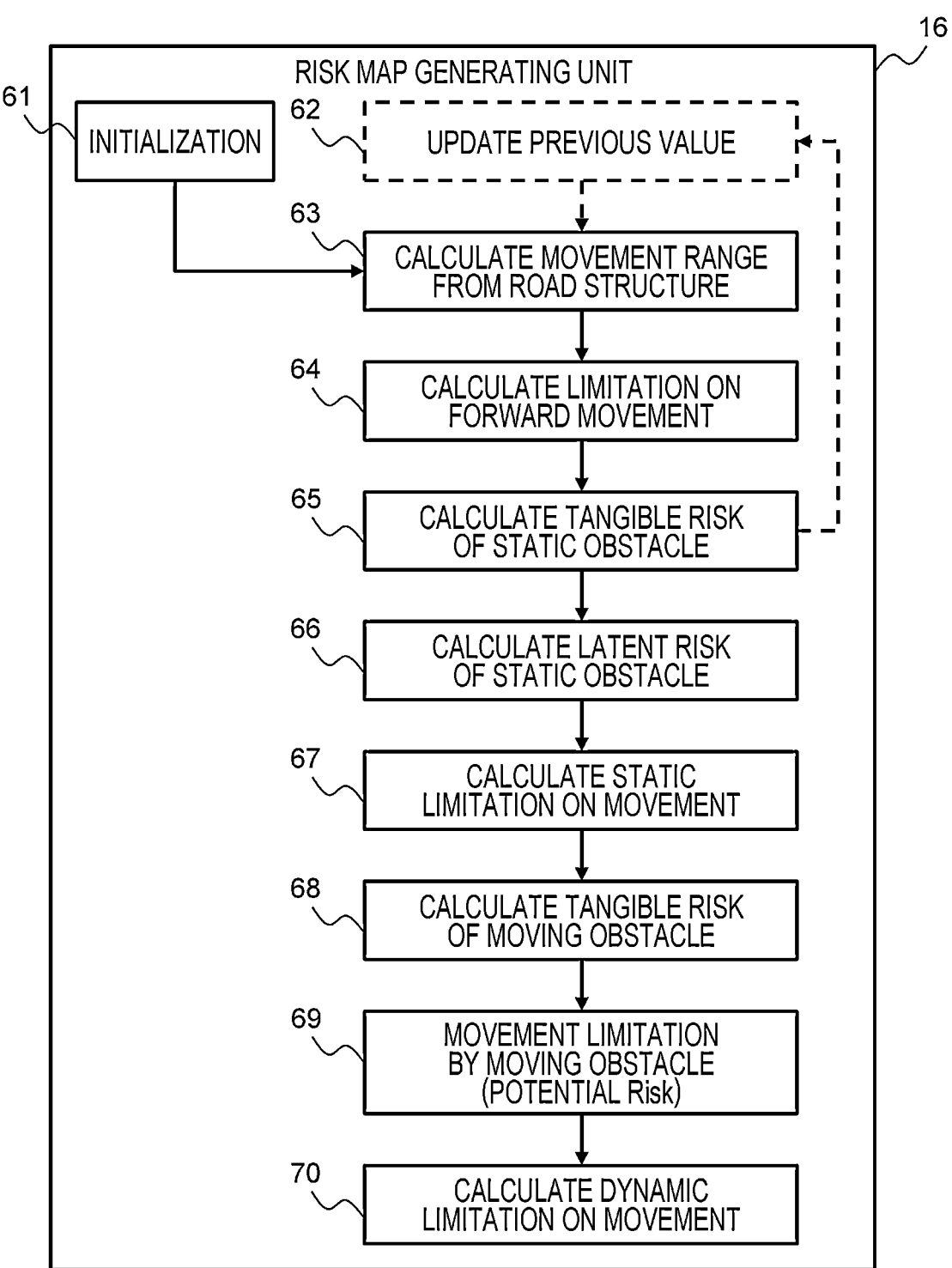

RISK MAP GENERATING UNIT    16

61  INITIALIZATION

62  UPDATE PREVIOUS VALUE

63  CALCULATE MOVEMENT RANGE
FROM ROAD STRUCTURE

64  CALCULATE LIMITATION ON
FORWARD MOVEMENT

65  CALCULATE TANGIBLE RISK
OF STATIC OBSTACLE

66  CALCULATE LATENT RISK
OF STATIC OBSTACLE

67  CALCULATE STATIC
LIMITATION ON MOVEMENT

68  CALCULATE TANGIBLE RISK
OF MOVING OBSTACLE

69  MOVEMENT LIMITATION
BY MOVING OBSTACLE
(POTENTIAL Risk)

70  CALCULATE DYNAMIC
LIMITATION ON MOVEMENT

FIG. 5

| TRAVELING RISK LEVEL | ROAD STRUCTURE | | | SIDE WALL | ROAD BOUNDARY | OBSTACLE | | | BLIND SPOT |
|---|---|---|---|---|---|---|---|---|---|
| | WHITE LINE | YELLOW LINE | SHAPE | | | VEHICLE | TWO-WHEEL VEHICLE | PEDESTRIAN | |
| 100 | WHITE LINE | | | | | | | | |
| 90 | STOP LINE (RED) | OPPOSITE | | | MEDIAN STRIP | | | STATIC/MOVING | STRUCTURE |
| 80 | STOP LINE (YELLOW) | RIGHT | | HIGH | STEEL SHEET | | STATIC/MOVING | | VEHICLE |
| 70 | STOP SIGN | LEFT | | | WIRE | STATIC/MOVING | | | MOVEMENT LIMITATION ON HOST VEHICLE |
| 60 | CONTINUOUS LINE (OPPOSITE) | | | DRAINAGE DITCH | POLE | | | | OUT OF SENSOR DETECTION RANGE |
| 50 | CONTINUOUS LINE (RIGHT) | | ACUTE CURVE | LOW | | | | | |
| 40 | CONTINUOUS LINE (LEFT) | | | | | | | | |
| 30 | | | GENTLE CURVE | EXTREMELY LOW | | | | | |
| 20 | BROKEN LINE | | TOP OF STEEP HILL | | | | | | |
| 10 | | | START AND END OF STEEP HILL | | | | | | |
| 0 | STOP LINE (BLUE) | | STRAIGHT AHEAD | | | | | | |

TRACK GENERATING UNIT   17

71   DETERMINE THRESHOLD FOR BINARIZATION

72   BINARIZATION

73   EXPAND WHITE AREA BY SIZE EQUIVALENT TO VEHICLE WIDTH

74   THINNING

75   CALCULATE RISK VALUE ON TRACK

76   CALCULATE SPEED FROM RISK VALUE

100

SYSTEM AND METHOD FOR VEHICLE TRACK GENERATION FROM RISK MAPS

TECHNICAL FIELD

The present invention relates to an electronic controller incorporated in a vehicle and relates particularly to a track generating method.

BACKGROUND ART

In recent years, to realize comfortable and safe driving assistance and autonomous driving of a vehicle, an electronic controller has been proposed, which calculates a traveling risk level of a host vehicle, based on a surrounding environment of the vehicle recognized by a sensor, and performs driving assistance according to the calculated risk level.

Background art in this technical field includes the following prior art. PTL 1 (JP 2017-41149 A) describes a path generating apparatus including: a cell division unit that generates cells formed by dividing a plane into lattice cells each having a given size, based on floor plan data including information indicating a type of a constituent element of a house, and that sets the information indicating the type of the constituent element in each of the cells; a thinning unit that reads the information indicating the type of the constituent element set in the cell, that specifies an outer edge of a passable area, based on the possibility or impossibility of passing through the constituent element, the possibility or impossibility being predetermined in association with the type of the constituent element, and that generates passage data created by thinning the passable region; a graph generating unit that generates a graph including nodes each representing an end point or an intersection of a passage and an edge connecting the nodes, based on the passage data generated by the thinning unit; and a path search unit that sets a start point and an end point, based on input from a user, and that searches for a path from the start point to the end point, using the graph generated by the graph generating unit.

PTL 2 (JP 2020-53069 A) discloses an in-vehicle electronic controller incorporated in a vehicle, the in-vehicle electronic controller including: a host vehicle information acquiring unit that acquires host vehicle information about a movement of the vehicle; a presence time range determining unit that based on the host vehicle information, determines host vehicle presence time range information indicating a presence time range of the vehicle at each position around the vehicle; an environmental element presence time range determining unit that based on surrounding environmental element information, determines environmental element presence time range information indicating a presence time range of an environmental element at each position around the vehicle; and a traveling risk level determining unit that based on the presence time range information and the environmental element presence time range information, identifies an area where a risk of the host vehicle's colliding against the environmental element around the vehicle is high.

CITATION LIST

Patent Literature

PTL 1: JP 2017-41149 A
PTL 2: JP 2020-53069 A

SUMMARY OF INVENTION

Technical Problem

When a track is generated based on a risk map onto which a traveling risk level is mapped, a track is retrieved from the risk map as a track that minimizes the sum of evaluation items. This process requires an enormous amount of calculations. Thus, a method of calculating a track from a risk map with a small amount of calculations is in demand.

Solution to Problem

A typical example of the invention disclosed herein is as follows. An electronic controller incorporated in a vehicle has an arithmetic device that executes a given process, and a storage device to which the arithmetic device is accessible. The electronic controller includes: a risk map generating unit that determines a traveling risk level in an area around the vehicle, based on external environment information acquired by an external environment sensor installed in the vehicle, movement information on the vehicle, and map information, and that maps the traveling risk level onto a map to generate a risk map; and a track generating unit that generates a traveling track of the vehicle, using the risk map. The track generating unit generates at least one binarized image representing the risk map divided into a low risk area and a high risk area, by a binarization process by which whether the traveling risk level is larger than a given set value is determined, performs a thinning process on the at least one binarized image to determine a center line in a width direction of the low risk area, and generates a traveling track of the vehicle, based on the determined center line.

Advantageous Effects of Invention

According to one aspect of the present invention, a track can be calculated from a risk map with a small amount of calculations. Problems, configurations, and effects other than those described above will be clarified by the following description of embodiments.

BRIEF DESCRIPTION OF DRAWINGS

FIG. 3 is a logical configuration diagram of a risk map generating unit.

FIG. 5 depicts an example of a risk table in which risk values are defined.

DESCRIPTION OF EMBODIMENTS

Figure 1:
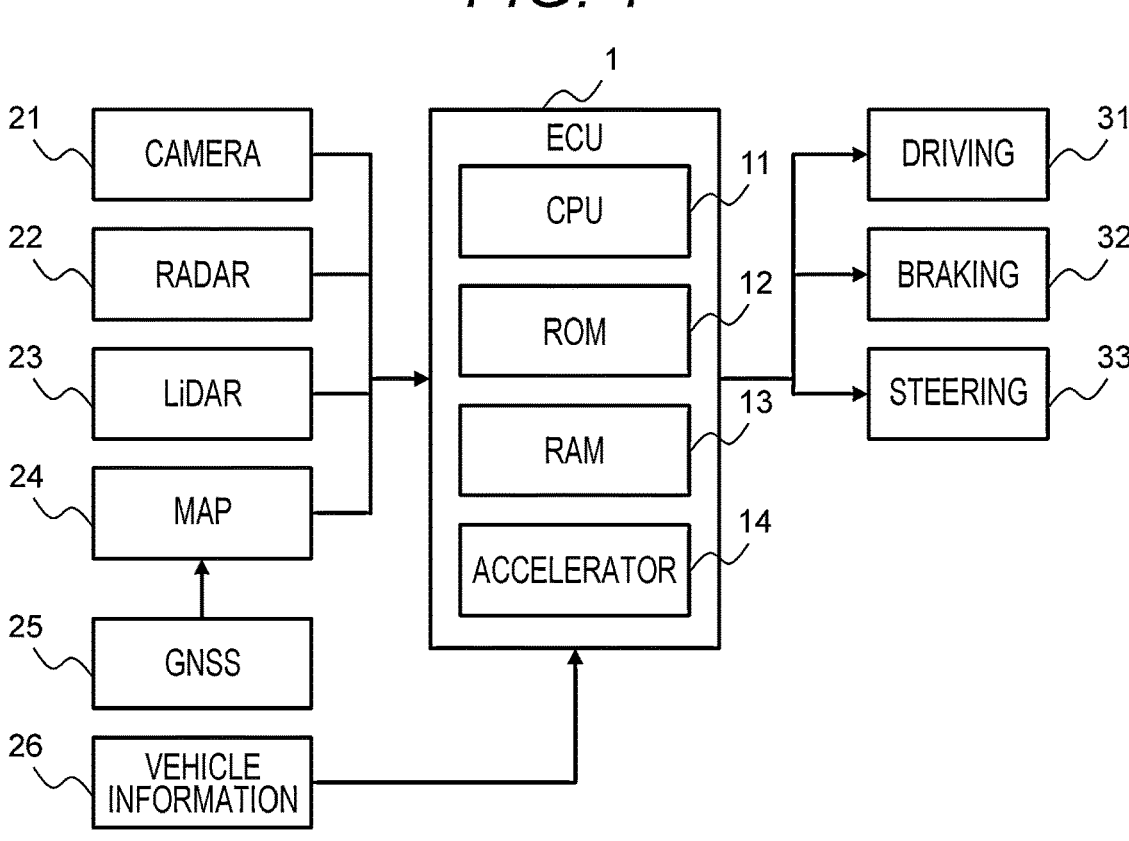
FIG. 1 is a physical configuration diagram of an electronic controller according to an embodiment of the present invention.

FIG. 1 is a physical configuration diagram of an electronic controller 1 according to an embodiment of the present invention.

The electronic controller (ECU) 1 includes a CPU11, a nonvolatile memory (ROM or Read-Only Memory) 12, a volatile memory (RAM or Random Access Memory) 13, and an accelerator 14. The CPU11 is an arithmetic device that executes a program stored in the volatile memory 13. The non-volatile memory 12, which is a storage device having a non-volatile storage area that holds stored data even when power is cut off, includes a program area storing a program executed by the CPU11 and a data area temporarily storing data that the CPU11 uses when executing a program. The volatile memory 13, which is a storage device having a volatile storage area, stores data that the CPU11 uses when executing a program. The accelerator 14, which is an arithmetic device capable of performing a specific computation at high speed, executes image processing at a risk map generating unit 16 and a track generating unit 17. The electronic controller 1 communicates with a different electronic controller and other sensors via a network, such as CAN or Ethernet.

The electronic controller 1 receive input of observation results from sensors, such as a camera 21, a radar 22, and a LiDAR23. The electronic controller 1 is connected to a map unit 24 that provides map information, using positioning information from a global navigation satellite system (GNSS) 25. The electronic controller 1 receives also input of vehicle information 26 indicating behavior of a vehicle, such as the speed and the acceleration of the vehicle. The electronic controller 1 outputs a drive control signal 31, a brake control signal 32, and a steering control signal 33 to control traveling of the vehicle.

Figure 2:
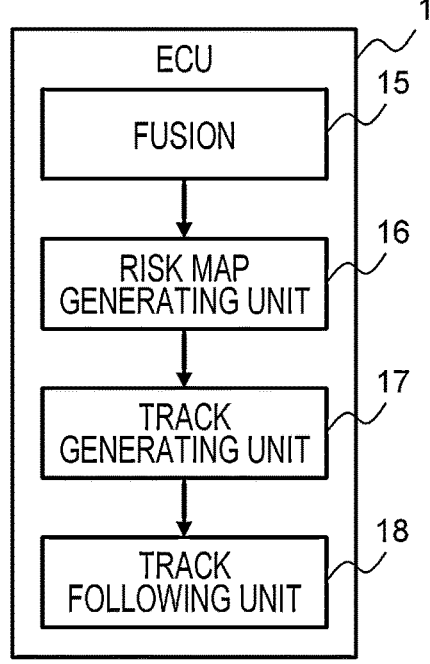
FIG. 2 is a logical configuration diagram of the electronic controller according to the embodiment of the present invention.

FIG. 2 is a logical configuration diagram of the electronic controller 1 according to the embodiment of the present invention.

The electronic controller 1 includes a fusion unit 15, the risk map generating unit 16, the track generating unit 17, and a track following unit 18. The fusion unit 15 integrates observation results of a plurality of sensors (the camera 21, the radar 22, the LiDAR23, etc.) to specify the position, size, and type of a target object around the vehicle. The risk map generating unit 16 generates a risk map indicating a traveling risk level around the vehicle, based on the specified target object. The track generating unit 17 generates a track on which the vehicle should travel, using the generated risk map. The track following unit 18 generates the drive control signal 31, the brake control signal 32, and the steering control signal 33 for controlling the vehicle along the generated track. The drive control signal 31 is a signal for controlling the rotation of a driving source (an engine or a motor), that is, controlling the acceleration and speed. The brake control signal 32 is a signal for controlling deceleration by braking. The steering control signal 33 is a signal for controlling the traveling direction of the vehicle by steering.

FIG. 3 is a logical configuration diagram of the risk map generating unit 16.

Figure 4A:
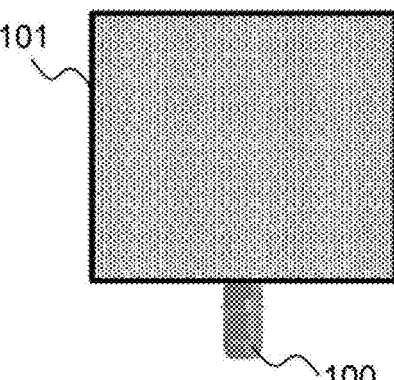
FIG. 4A depicts a process of generating a risk map.

The risk map generating unit 16 first initializes various parameters (61). For example, the size of a grid is determined from the minimum size of a target object, which is a risk-posing object, and the detection range of a sensor, and an image plane 101 is defined. More specifically, when the width of a white line that marks a road boundary or demarcates a lane is 10 cm and the detection range is 300 m square, the grid size is set equal to the width of the white line, i.e., 10 cm, and a risk map of 3000×3000 pixels (see FIG. 4A) is created in a range of 300 m×150 m in front of a host vehicle 100. Thus, a storage area for storing the image plane 101 of this risk map is reserved.

Figure 4B:
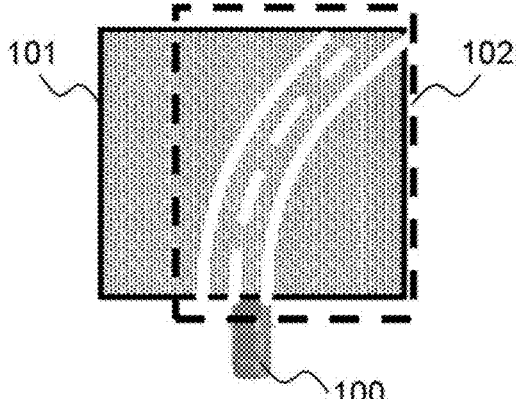
FIG. 4B depicts a process of generating the risk map.

Subsequently, the risk map generating unit 16 calculates a movement range from a road structure (63). For example, the movement range of the host vehicle is determined from the road structure (e.g., a curve of a road, an intersection, etc.) in the traveling direction of the host vehicle, and a movement range 102 in the defined image plane 101 is extracted from the determined movement range. For example, as shown in FIG. 4B, when the road curves rightward, a range on the left side of the road is excluded and a range on the right side is extracted as the movement range 102. The road structure is obtained from map data acquired from the map unit 24 or from an observation result of a target object (e.g., a road boundary line) observed by a sensor.

Figure 4C:
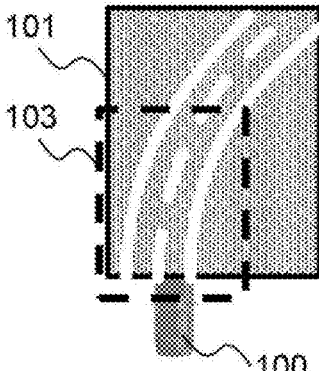
FIG. 4C depicts a process of generating the risk map.

Subsequently, the risk map generating unit 16 limits the movement range in front of the host vehicle (64). For example, according to the traveling speed of the host vehicle, the movement range is limited to a range in which the host vehicle can travel within a given time. Specifically, a rectangle 103 is defined in front of the host vehicle (FIG. 4C). The rectangle 103 is made shorter in the traveling direction when the vehicle speed is low, and is made longer in the traveling direction when the vehicle speed is high.

Figure 4D:
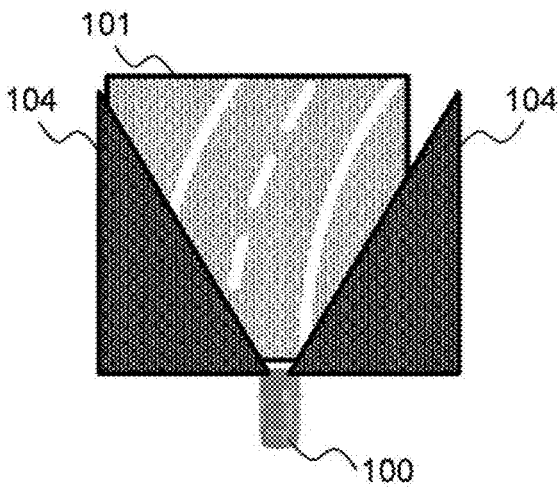
FIG. 4D depicts a process of generating the risk map.
Figure 4E:
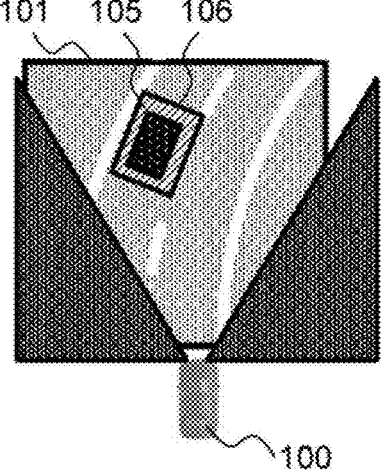
FIG. 4E depicts a process of generating the risk map.

Subsequently, the risk map generating unit 16 calculates an apparent risk of a stationary obstacle (65). For example, because the presence or absence of an obstacle is unknown in areas 104 outside the detection range of the sensor, the areas 104 are mapped as high risk areas (see FIG. 4D). The high risk areas 104, which are rectangles, prevent discontinuity between the vehicle position and a track to be generated, thus allowing generation of a smooth track on which the vehicle can travel. In addition, the risk map generating unit 16 maps a stationary obstacle observed by the sensor and a stationary obstacle included in map data acquired from the map unit 24, onto the risk map as high risk areas such that the original positions, sizes, and orientations of the stationary obstacles are maintained in the risk map. At this time, different traveling risk levels of individual stationary obstacles are obtained by referring to a risk table (FIG. 5). It should be noted that a high risk area is mapped on the periphery of a stationary obstacle, according to an observation error of the sensor. For example, as shown in FIG. 4E, a stationary obstacle 105 observed by the sensor and the periphery 106 of the stationary obstacle 105 are mapped on the risk map as high risk areas. The stationary obstacle area 105 and the peripheral area 106 are given different traveling risk levels. In addition, according to a type observed, a high risk area is mapped in the peripheral area 106 of the stationary obstacle 105 (e.g., an area where a door of a parked vehicle is opened).

The risk map generating unit 16 updates a previous value, which is inputted at step 63, with a calculated value of an apparent risk of a stationary obstacle (62).

Figure 4F:
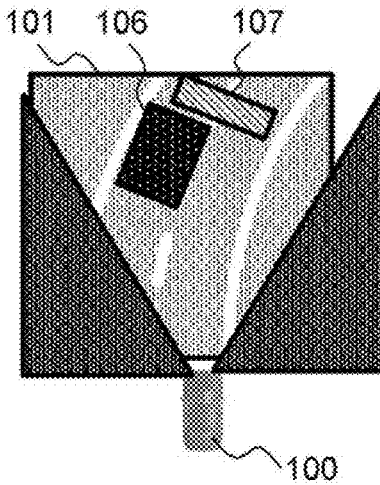
FIG. 4F depicts a process of generating the risk map.

Subsequently, the risk map generating unit 16 calculates a potential risk of a stationary obstacle (66). For example, the presence or absence of a blind spot is determined from the height of a stationary obstacle observed by the sensor and that of a stationary obstacle included in map data acquired from the map unit 24. When it is determined that a blind spot is present, a potential risk area 107 is mapped onto the risk map according to the location and type of the blind spot. At this time, different traveling risk levels of individual stationary obstacles are obtained by referring to a risk table (FIG. 5). Specifically, in a case shown in FIG. 4F, a potential risk area 107 is mapped, which is an area providing a possibility of a pedestrian's jumping out from the shadow of a parked vehicle 106.

Figure 4G:
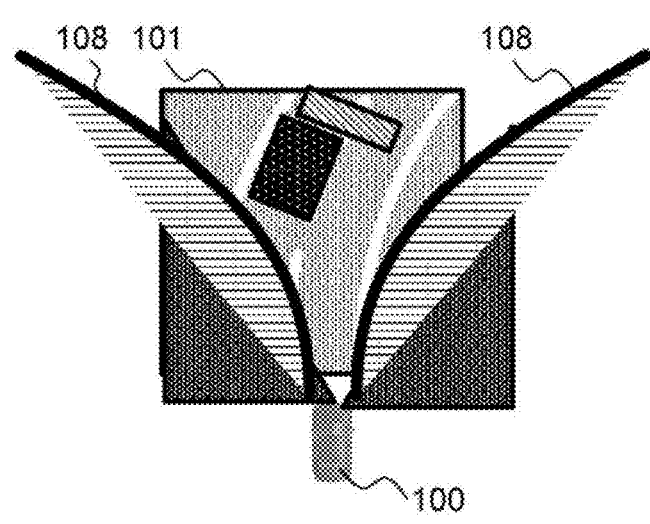
FIG. 4G depicts a process of generating the risk map.

Subsequently, the risk map generating unit 16 limits a movement range from the current position of the host vehicle (67). For example, at the current speed of the host vehicle, the movement range is limited to a range in which the host vehicle can move under a lateral acceleration constraint (e.g., 0.1G or less) derived from traveling performance of the vehicle, and the limited movement range is mapped onto the risk map as a high risk area 108 (see FIG. 4G). At this time, a traveling risk level is obtained by referring to the risk table (FIG. 5).

Figure 4H:
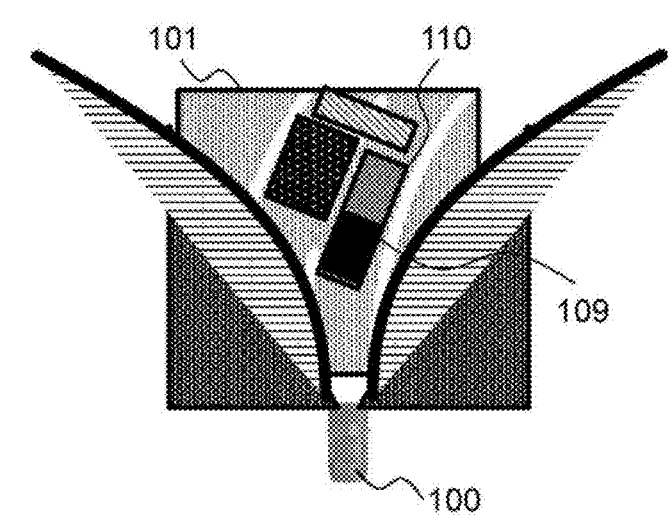
FIG. 4H depicts a process of generating the risk map.

Subsequently, the risk map generating unit 16 calculates an apparent risk of a moving obstacle (68). For example, a moving obstacle observed by the sensor is mapped onto the risk map as a high risk area such that the original position, size, and orientation of the moving obstacle are maintained in the risk map. At this time, a traveling risk level is obtained by referring to the risk table (FIG. 5). Taking account of a speed change of the moving obstacle and a predicted course the moving obstacle travels, the risk map generating unit 16 maps an area of the moving obstacle on the predicted course, as a high risk area. For example, as shown in FIG. 4H, a moving obstacle 109 observed by the sensor and a predicted area 110 of the moving obstacle 109 are mapped onto the risk map as high risk areas. At this time, the currently moving obstacle area 109 and the predicted moving obstacle area 110 are given different traveling risk levels. In addition, a risk at the current location is set low, while a risk at a position on the predicted course is set high.

Subsequently, the risk map generating unit calculates a potential risk of a moving obstacle (69). For example, the presence or absence of a blind spot is determined from the height of a moving obstacle observed by the sensor. When it is determined that a blind spot is present, the potential risk area 107 is then mapped according to the location and type of the blind spot.

Figure 4I:
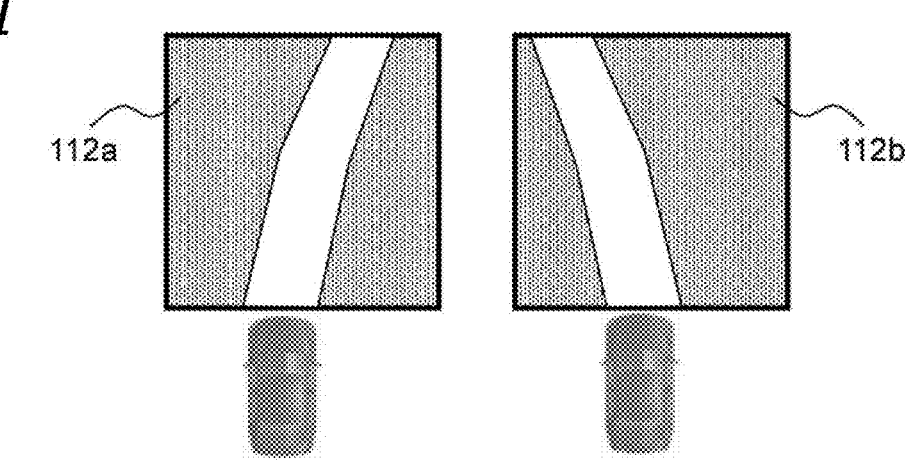
FIG. 4I depicts a process of generating the risk map.
Figure 4J:
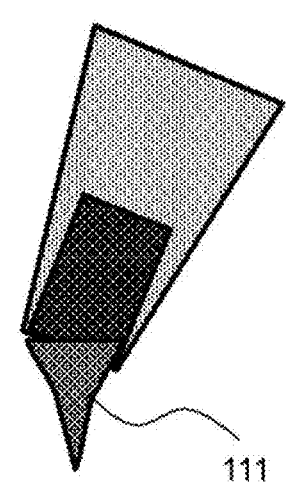
FIG. 4J depicts a process of generating the risk map.
Figure 4K:
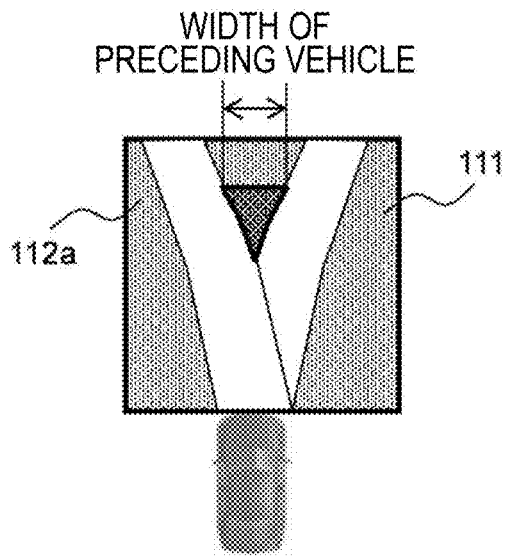
FIG. 4K depicts a process of generating the risk map.
Figure 4L:
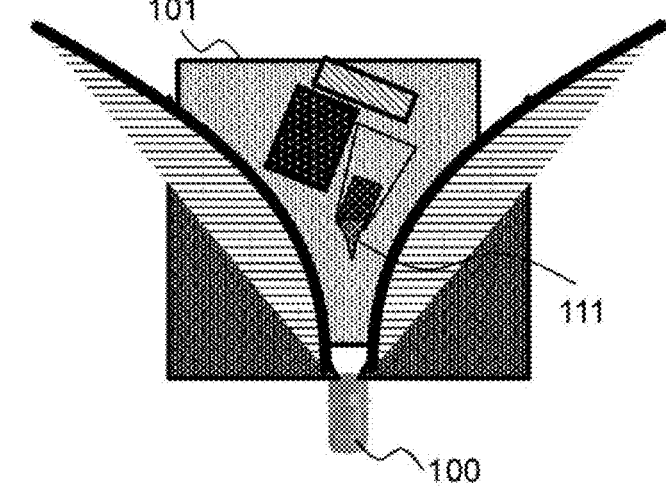
FIG. 4L depicts a process of generating the risk map.

Subsequently, the risk map generating unit 16 limits a dynamic movement range of the host vehicle (70). For example, as shown in FIGS. 4I to 4K, an area 111 in which an obstacle cannot be avoided (area where traveling possible ranges 112a and 112b overlap and which matches in width to a preceding vehicle) is calculated from the traveling possible ranges 112a and 112b of the host vehicle where the host vehicle is able to avoid an obstacle by moving in the left or right direction under a lateral acceleration restriction (e.g., 0.1 G or less) generated at the current speed of the host vehicle, and is mapped onto the risk map, as a high risk area 111. At this time, a traveling risk level is obtained by referring to the risk table (FIG. 5). Specifically, the host vehicle's traveling possible range for avoiding the moving obstacle is calculated with a lateral acceleration limit value taken into consideration, and, as shown in FIG. 4L, an evasion impossible range in which the moving obstacle cannot be avoided is mapped onto the risk map as a high risk area between the moving obstacle and the host vehicle.

FIG. 5 depicts an example of the risk table in which risk values are defined.

In the risk table, risk values are determined based on road structures (colors, shapes, locations, and meaning of road surface paints, road shapes, types and heights of side walls), obstacles (types of obstacles, obstacles moving or not moving), blind spot types, and the like. In the risk table, different risk values may be determined based on behavior of the vehicle (such as the speed and acceleration of the vehicle), a traveling environment, and the driver's operations (such as operation of the blinkers), in addition to external environment information shown in the table. The risk table is referred to by the risk map generating unit 16, and a risk of an obstacle observed or on a map is calculated. In the risk table, risk values are determined such that a risk value for an obstacle with a higher traveling risk level is set higher.

Figure 6:
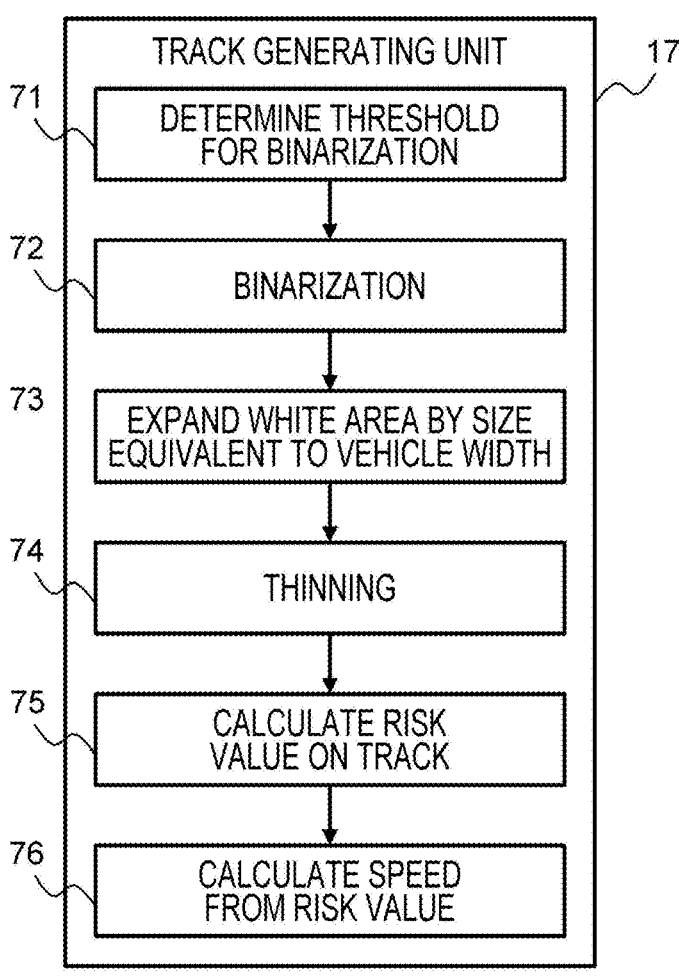
FIG. 6 is a logical configuration diagram of a track generating unit.

FIG. 6 is a logical configuration diagram of the track generating unit 17.

First, the track generating unit 17 determines a threshold used in a binarization process (71). For example, the threshold used in the binarization process may be changed based on a situation around the vehicle. The threshold may be changed based on behavior of the vehicle (such as the speed and acceleration of the vehicle), a traveling environment, and the driver's operations (such as operation of the blinkers), in addition to a situation around the vehicle (external environment information). More specifically, when many target objects are observed around the vehicle, that is, the vehicle's surroundings are congested, the threshold is increased in size so that a safer track is generated. When few target objects are observed around the vehicle, on the other hand, the threshold is decreased in size to increase track options. In another approach, tracks with a plurality of traveling risk levels may be generated using a plurality of thresholds and a track may be selected in a subsequent process. For example, from the viewpoint of increasing a margin for the traffic rules, the threshold may be set to 15, or from the viewpoint of decreasing the margin for the traffic rules and giving priority to at least preventing a traffic accident, the threshold may be set to 55.

Figure 7:
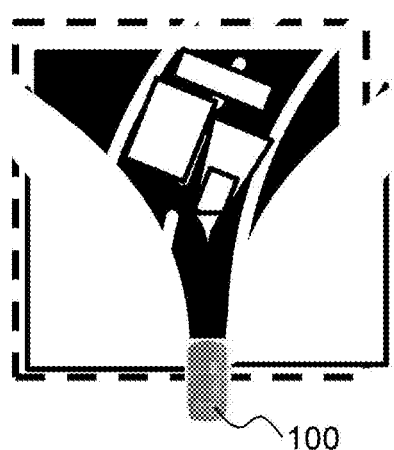
FIG. 7 depicts a binarized risk map.

Subsequently, the track generating unit 17 executes the binarization process (72). For example, in the binarization process, an area with a traveling risk level lower than the threshold determined at step 71 is defined as 0, and an area with a traveling risk level higher than the threshold is defined as 1. Then, a low risk area with a value "0" is colored black as a high risk area with a value "1" is colored white. In this manner, the risk map is visualized in binary expression (see FIG. 7).

Subsequently, the track generating unit 17 executes an expansion process of expanding the white area with a high traveling risk level (73). For example, the expansion process is executed the number of times that is given by rounding off decimal points of a value given by dividing the half of the vehicle width by a grid size determined in an initialization process. Noise in the black low risk area can be eliminated by the expansion process. In other words, an area where the host vehicle can travel in such a way as to avoid a traveling risk level can be obtained as the black low risk area. Thereafter, black area and white area are swapped for the next process, that is, the low risk area is turned white as the high risk area is turned black.

Subsequently, the track generating unit 17 executes a thinning process (74). This thinning process is a process of generating a line with a line width equal to the width of one pixel. It is a process of determining a center line in the width direction of the low risk area and defining the determined center line as a generated track of the vehicle.

Subsequently, the track generating unit 17 acquires a risk value on the track generated by the thinning process (75). The track generating unit 17 then calculates the traveling speed of the vehicle from the acquired risk value (76). For example, a target vehicle speed vt is calculated by the following equation where lower one of the current vehicle speed and a limit speed is v km/h and a risk value is x %.

$$vt = v \times (1.0 - x/100) \qquad 5$$

When the track is interrupted halfway, the target vehicle speed vt at an end point of the track is set to 0 and the target vehicle speed is calculated so that the vehicle can be stopped smoothly without applying sharp deceleration. It should be noted, however, that the target vehicle speed vt is not set to 0 at an end point of the risk map at which the track is interrupted.

As described above, according to the electronic controller of the embodiment of the present invention, the track can be calculated from the risk map by a simple repetitive process. It is therefore optimal for applications of an arithmetic device, such as an accelerator, and allows a reduction in a processing time required for track generation. Particularly, because the risk map can be generated by image processing, such as patterning and superimposition, a processing time required for risk map generation can be reduced. Furthermore, by taking into consideration an evasion impossible area at the time of risk map generation, a smooth track can be generated when an evasive action to the left or right is taken.

The present invention is not limited to the above-described embodiment, and includes various modifications made within the scope of the appended claims and configurations equivalent to such modifications. For example, the above embodiment has been described in detail to give an understandable description of the present invention, and the present invention is not necessarily limited to a mode including all constituent elements described above. Some of constituent elements of one embodiment may be replaced with constituent elements of another embodiment. In addition, a constituent element of another embodiment may be added to a constituent element of a certain embodiment. Furthermore, some of constituent elements of each embodiment may be deleted therefrom or added to or replaced with other constituent elements.

Some or all of constituent elements, functions, processing units, processing means, and the like may be provided in the form of hardware by, for example, packaging them in an integrated circuit, or may be provided in the form of software by causing a processor to interpret and execute programs for implementing individual functions.

Information, such as a program, a table, and a file, for implementing each function can be stored in a storage device, such as a memory, a hard disk, and a solid state drive (SSD), or in a recording medium, such as an IC card, an SD card, and a DVD.

While control lines and information lines considered to be necessary for the description are indicated, all control lines and information lines required for configuration are not necessarily indicated entirely. It is safe to consider that actually, almost all constituent elements are interconnected.

The invention claimed is:

1. An electronic controller incorporated in a vehicle, the electronic controller having an arithmetic device that executes a given process and a storage device to which the arithmetic device is accessible, wherein the electronic controller comprises:

a risk map generating unit that determines a traveling risk level in an area around the vehicle, based on external environment information acquired by an external environment sensor installed in the vehicle, movement information on the vehicle, and map information, and that maps the traveling risk level onto a map to generate a risk map; and a track generating unit that generates a traveling track of the vehicle, using the risk map, wherein the track generating unit generates at least one binarized image representing the risk map divided into a low risk area and a high risk area, by a binarization process carried out on the risk map that is generated from the external environment information, the movement information, and the map information, the binarization process including determining, for each pixel in the risk map, whether the traveling risk level is larger than a set value to define a contiguous low risk area and a contiguous high risk area, and wherein the track generating unit, performs a thinning process on the at least one binarized image to determine a center line within the contiguous low risk area, and generates the traveling track of the vehicle solely from the determined center line.

2. The electronic controller according to claim 1, wherein the track generating unit changes the set value, based on at least one of the external environment information, vehicle information indicating behavior of the vehicle, the vehicle information including at least a speed and an acceleration, and a traveling environment of the vehicle.

3. The electronic controller according to claim 1, wherein the risk map generating unit determines the traveling risk level, based on at least one of the external environment information, vehicle information indicating behavior of the vehicle, the vehicle information including at least a speed and an acceleration, and a traveling environment of the vehicle.

4. The electronic controller according to claim 1, wherein based on traveling performance of the vehicle, an area where traveling of the vehicle is considered to be impossible, based on the traveling performance of the vehicle, is mapped onto the risk map, as an area where the traveling risk level is high.

5. The electronic controller according to claim 1, wherein the track generating unit generates a plurality of traveling tracks, using a plurality of the set values.

6. A track generating method executed by an in-vehicle electronic controller having an arithmetic device that executes a given process and a storage device to which the arithmetic device is accessible, wherein the track generating method comprises:

a risk map generating procedure of causing the arithmetic device to determine a traveling risk level in an area around a vehicle, based on external environment information acquired by an external environment sensor installed in the vehicle, movement information on the vehicle, and map information, and to map the traveling risk level onto a map to generate a risk map; and a track generating procedure of causing the arithmetic device to generate a traveling track of the vehicle, using the risk map, and wherein at the track generating procedure, the arithmetic device generates at least one binarized image representing the risk map divided into a low risk area and a high risk area, by a binarization process carried out on the risk map that is generated from the external environment information, the movement information, and the map information, the binarization including process determining, for each pixel in the risk map, whether the traveling risk level is larger than a set value to define a contiguous low risk area and a contiguous high risk area, and wherein at the track generating procedure, the arithmetic device, performs a thinning process on the at least one binarized image to determine a center line within the contiguous low risk area, and generates the traveling track of the vehicle solely from the determined center line.

* * * * *